United States Patent
Lawson

(10) Patent No.: US 10,882,362 B2
(45) Date of Patent: Jan. 5, 2021

(54) STIFFENERS FOR SIPE-MOLDING MEMBERS

(71) Applicant: Robert Cecil Lawson, Pelzer, SC (US)

(72) Inventor: Robert Cecil Lawson, Pelzer, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 555 days.

(21) Appl. No.: 15/515,371

(22) PCT Filed: Sep. 30, 2014

(86) PCT No.: PCT/US2014/058351
§ 371 (c)(1),
(2) Date: Mar. 29, 2017

(87) PCT Pub. No.: WO2016/053307
PCT Pub. Date: Apr. 7, 2016

(65) Prior Publication Data
US 2017/0246820 A1    Aug. 31, 2017

(51) Int. Cl.
*B29D 30/06* (2006.01)
*B60C 11/12* (2006.01)

(52) U.S. Cl.
CPC ...... *B60C 11/1218* (2013.01); *B29D 30/0606* (2013.01); *B60C 11/12* (2013.01);
(Continued)

(58) Field of Classification Search
CPC ........ B29D 2030/0613; B29D 30/0606; B60C 11/12; B60C 11/1204; B60C 11/1218;
(Continued)

(56) References Cited

U.S. PATENT DOCUMENTS 1,413,190 A    4/1922 Rapson
1,509,259 A    9/1924 Rett et al.
(Continued)

FOREIGN PATENT DOCUMENTS

CN     1706629 A    12/2005
CN   101045285 A    10/2007
(Continued)

OTHER PUBLICATIONS

ISR with WO for application PCT/US2015/053346 dated Sep 30, 2015.
(Continued)

*Primary Examiner* — Alexander M Weddle
(74) *Attorney, Agent, or Firm* — Hahn Loeser & Parks LLP; Bret A. Hrivnak

(57) ABSTRACT

Embodiments of the invention include methods for reducing deformation of a sipe-molding member (10) arising during manufacturing operations, and sipe-molding members (10) comprising a sipe-forming portion (12) and a plurality of stiffening members (20) spaced along the sipe-forming portion. The sipe-forming portion (12) has a length extending in a lengthwise direction of the sipe-molding member (10), a height configured to extend into a depth of a molding cavity, and a thickness extending perpendicular to both the length and height. The sipe-molding member (10) is configured to form a sipe having a thickness commensurate with the thickness of the sipe-forming portion, a length formed by at least a portion of the length of the sipe-forming portion, and a depth formed by at least a portion of the height of the sipe-forming portion. Each of the plurality of stiffening members (20) extend outwardly from the thickness of the sipe-forming element. Further embodiments include methods of forming a molded tire tread.

20 Claims, 3 Drawing Sheets

(52) U.S. Cl.
CPC ...... *B60C 11/1204* (2013.01); *B60C 11/1259* (2013.01); *B60C 11/1263* (2013.01); *B60C 11/1281* (2013.01); *B29D 2030/0613* (2013.01); *B60C 2011/1254* (2013.01)

(58) Field of Classification Search
CPC ............. B60C 11/1259; B60C 11/1263; B60C 11/1281; B60C 11/1254
USPC ........................................................ 264/326
See application file for complete search history.

(56) References Cited

U.S. PATENT DOCUMENTS

| | | | |
|---|---|---|---|
| 2,121,871 A | 6/1938 | Havens | |
| 2,121,955 A | 6/1938 | Eger | |
| 2,264,767 A | 12/1941 | Ofensend | |
| 2,327,057 A | 8/1943 | Ofensend | |
| 2,637,362 A | 5/1953 | Briscoe et al. | |
| 2,696,863 A | 12/1954 | Ewart et al. | |
| 2,732,589 A | 1/1956 | Steadman | |
| 3,115,919 A | 12/1963 | Roberts | |
| 3,373,790 A | 3/1968 | Newman et al. | |
| 3,608,602 A | 9/1971 | Youngblood | |
| 3,653,422 A | 4/1972 | French | |
| 3,770,040 A | 11/1973 | De Cicco | |
| 3,945,417 A | 3/1976 | Harrelson, Jr. | |
| 3,998,256 A | 12/1976 | Verdier | |
| 4,574,856 A | 3/1986 | Graas | |
| 4,703,787 A | 11/1987 | Ghilardi | |
| 4,723,584 A | 2/1988 | Yamaguchi et al. | |
| 4,794,965 A | 1/1989 | Lagnier | |
| 4,832,099 A | 5/1989 | Matsumoto | |
| 4,994,126 A | 2/1991 | Lagnier | |
| 5,031,680 A | 7/1991 | Kajikawa et al. | |
| 5,248,357 A | 9/1993 | Miyanaga et al. | |
| 5,316,063 A | 5/1994 | Lagnier | |
| 5,342,462 A | 8/1994 | King et al. | |
| 5,445,691 A | 8/1995 | Nakayama et al. | |
| 5,503,207 A | 4/1996 | Ochiai et al. | |
| 5,535,798 A | 7/1996 | Nakamura | |
| 5,769,977 A | 6/1998 | Masaoka | |
| 5,783,002 A | 7/1998 | Lagnier | |
| 6,012,499 A | 1/2000 | Masaoka | |
| 6,102,092 A | 8/2000 | Radulescu | |
| 6,116,310 A | 9/2000 | Shinohara | |
| 6,123,130 A | 9/2000 | Himuro et al. | |
| 6,143,223 A | 11/2000 | Merino Lopez | |
| 6,196,288 B1 | 3/2001 | Radulescu et al. | |
| 6,264,453 B1 | 7/2001 | Jacobs et al. | |
| 6,315,018 B1 | 11/2001 | Watanabe | |
| 6,382,283 B1 | 5/2002 | Caretta | |
| 6,408,910 B1 | 6/2002 | Lagnier et al. | |
| 6,412,531 B1 | 7/2002 | Janajreh | |
| 6,439,284 B1 | 8/2002 | Fontaine | |
| 6,443,200 B1 | 9/2002 | Lopez | |
| 6,461,135 B1 | 10/2002 | Lagnier et al. | |
| 6,467,517 B1 | 10/2002 | Radulescu | |
| 6,668,885 B2 | 12/2003 | Ishiyama | |
| 6,668,886 B1 | 12/2003 | Iwamura | |
| 6,761,197 B2 | 7/2004 | Carra et al. | |
| 6,776,204 B2 | 8/2004 | Cesarini et al. | |
| 6,799,616 B2 | 10/2004 | Himuro | |
| 7,017,634 B2 | 3/2006 | Radulescu et al. | |
| 7,143,799 B2 | 12/2006 | Collette et al. | |
| 7,249,620 B2 | 7/2007 | Croissant et al. | |
| 7,338,269 B2 | 3/2008 | Delbet et al. | |
| 7,507,078 B2 | 3/2009 | Nguyen et al. | |
| 7,793,692 B2 | 9/2010 | Nguyen et al. | |
| 8,267,679 B2 | 9/2012 | Cuny et al. | |
| 8,276,629 B2 | 10/2012 | Bonhomme | |
| 8,393,365 B2 | 3/2013 | Janesh et al. | |
| 9,022,083 B2 | 5/2015 | Voss et al. | |
| 9,387,728 B2 | 7/2016 | Warfford et al. | |
| 9,981,507 B2 | 5/2018 | Warfford et al. | |
| 2002/0033214 A1 | 3/2002 | Carra et al. | |
| 2002/0142056 A1 | 10/2002 | Aperce et al. | |
| 2005/0081972 A1 | 4/2005 | Lopez | |
| 2005/0121124 A1 | 6/2005 | Tsubono | |
| 2005/0183807 A1 | 8/2005 | Hildebrand | |
| 2006/0027295 A1 | 2/2006 | Knispel et al. | |
| 2006/0088618 A1 | 4/2006 | Radulescu et al. | |
| 2007/0084534 A1 | 4/2007 | Byrne | |
| 2007/0095447 A1 | 5/2007 | Nguyen et al. | |
| 2007/0199634 A1 | 8/2007 | Sakamaki | |
| 2007/0295434 A1 | 12/2007 | Nguyen et al. | |
| 2008/0128062 A1 | 6/2008 | Lopez | |
| 2008/0152745 A1 | 6/2008 | Nguyen et al. | |
| 2008/0163970 A1 | 7/2008 | Ohara | |
| 2009/0065115 A1 | 3/2009 | Mathews | |
| 2009/0159167 A1 | 6/2009 | Scheuren | |
| 2009/0218020 A1 | 9/2009 | Sumi | |
| 2009/0301622 A1 | 12/2009 | Brown | |
| 2010/0300626 A1 | 12/2010 | Nguyen et al. | |
| 2011/0017374 A1 | 1/2011 | Bervas et al. | |
| 2011/0277898 A1 | 11/2011 | Barraud et al. | |
| 2012/0048439 A1 | 3/2012 | Christenbury | |
| 2013/0014873 A1 | 1/2013 | Voss et al. | |
| 2013/0164401 A1* | 6/2013 | Dusseaux .......... B29D 30/0606 425/28.1 |
| 2014/0090761 A1* | 4/2014 | Foucher ................ B60C 11/042 152/209.18 |
| 2015/0053320 A1 | 2/2015 | Mathonet et al. | |
| 2017/0021675 A1* | 1/2017 | Kose ................... B60C 11/0323 |
| 2017/0225517 A1 | 8/2017 | Lawson et al. | |
| 2017/0246820 A1 | 8/2017 | Lawson | |

FOREIGN PATENT DOCUMENTS

| | | |
|---|---|---|
| CN | 101148020 A | 3/2008 |
| DE | 2024279 A1 | 3/1971 |
| DE | 19506697 A1 | 8/1996 |
| EP | 540340 A2 | 5/1993 |
| EP | 721853 A1 | 7/1996 |
| EP | 925907 A1 | 6/1999 |
| EP | 1125709 A1 | 8/2001 |
| EP | 1782970 A1 | 5/2007 |
| EP | 1920951 A1 | 5/2008 |
| EP | 1935671 A2 | 6/2008 |
| EP | 1938939 A1 | 7/2008 |
| EP | 2376297 B1 | 10/2012 |
| EP | 2570273 A1 | 3/2013 |
| FR | 2730951 A1 | 8/1996 |
| FR | 2909588 A1 | 6/2008 |
| FR | 2971732 A1 | 8/2012 |
| GB | 474588 A | 11/1937 |
| GB | 2061837 A | 5/1981 |
| JP | 62268707 A | 11/1987 |
| JP | 02060805 A | 3/1990 |
| JP | 02-303908 | 12/1990 |
| JP | 2310108 A | 12/1990 |
| JP | 03090317 A | 4/1991 |
| JP | 03112705 A | 5/1991 |
| JP | 03-189112 | 8/1991 |
| JP | 03279006 A | 10/1991 |
| JP | 05169913 A | 7/1993 |
| JP | 5338412 A | 12/1993 |
| JP | 2001063323 A | 3/2001 |
| JP | 2001130227 A | 5/2001 |
| JP | 2002501458 A | 1/2002 |
| JP | 2003182314 A | 7/2003 |
| JP | 2003211922 A | 7/2003 |
| JP | 2004009886 A | 1/2004 |
| JP | 2005104194 A | 4/2005 |
| JP | 2005262973 A | 9/2005 |
| JP | 2006051863 A | 2/2006 |
| WO | 99/48707 A1 | 9/1999 |
| WO | 9948707 A1 | 9/1999 |
| WO | 0238399 A2 | 5/2002 |
| WO | 2010030276 A1 | 3/2010 |
| WO | 2010039148 A1 | 4/2010 |
| WO | 2010072523 A1 | 7/2010 |
| WO | 2012058171 A1 | 5/2012 |
| WO | 2013011335 A1 | 1/2013 |
| WO | WO-2014132196 A1 * | 9/2014 .......... B60C 11/1218 |

(56) References Cited

FOREIGN PATENT DOCUMENTS

| | | | |
|---|---|---|---|
| WO | 2015080771 A1 | 6/2015 | |
| WO | 2015080772 A1 | 6/2015 | |
| WO | 2015080799 A1 | 6/2015 | |
| WO | WO-2015080771 A1 * | 6/2015 | ......... B60C 11/0323 |
| WO | 2016053307 A1 | 4/2016 | |

OTHER PUBLICATIONS

PCT/US2014/058351 International Search Report and Written Opinion dated Jul. 8, 2015, 12 pages.

* cited by examiner

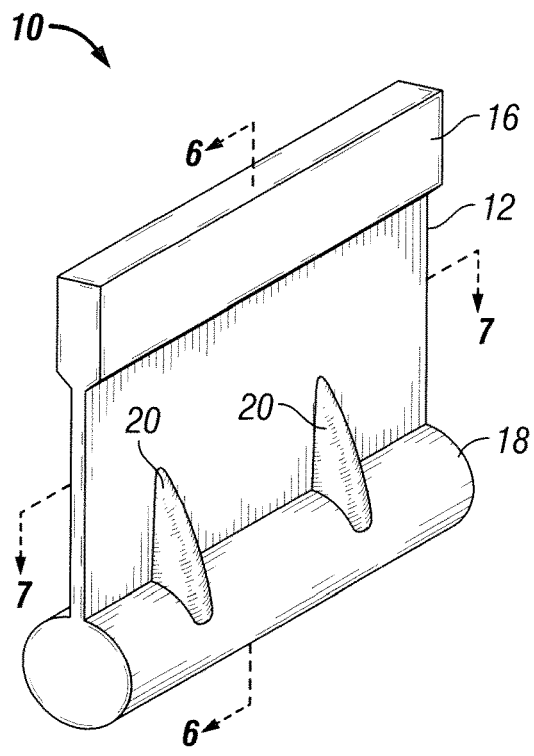
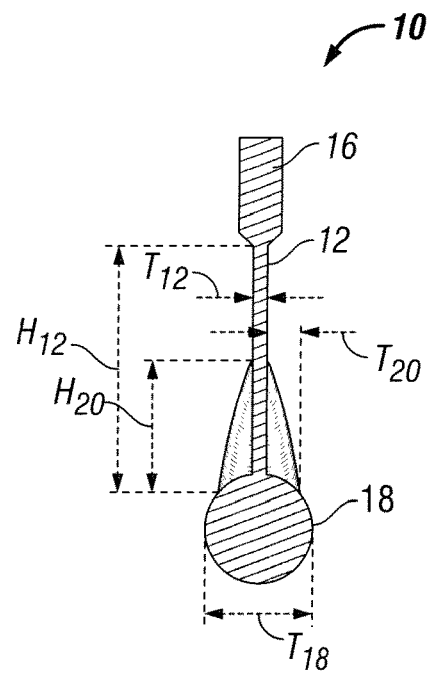
FIG. 5
FIG. 6
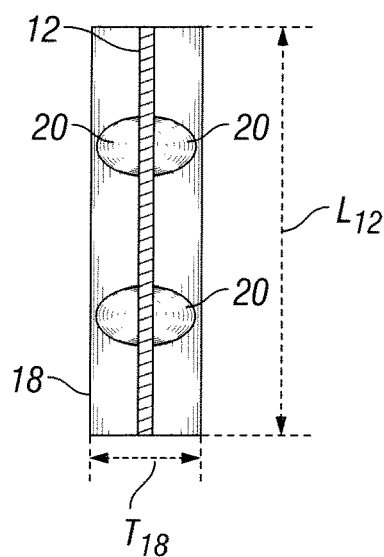
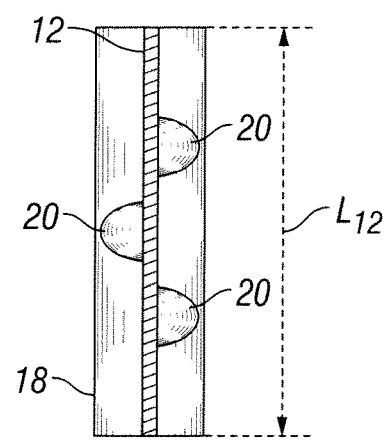
FIG. 7
FIG. 8

STIFFENERS FOR SIPE-MOLDING MEMBERS

BACKGROUND OF THE INVENTION

Field of the Invention

This invention relates generally sipe-molding members and tire treads formed there from, and more specifically, sipe-molding members having stiffeners and tire treads formed there from.

Description of the Related Art

Sipes (also referred to as "lamelles") are commonly formed using molding elements, which is referred to herein as "sipe-molding members"), where a thin member is used to form a sipe during molding operations. A sipe is a very narrow or thin void or slit, such that, during tire operation, opposing sides of the sipe contact or abutting one another. A sipe is distinguishable from a void, such as a lateral or longitudinal groove, whereby a void is sized such that during tire operation, opposing sides of the void remain spaced apart and do not contact one another. By doing so, a void is able to accept water, mud, snow, or any other material for the purpose of facilitating traction between the tread and an intended tire operating surface, such as a road surface.

It is known for metal products to experience unintentional deformation during forming operations, such as metallic laser sintering, for example. Deformation can occur due to the imbalances in heating and cooling. Accordingly, the resulting product can differ dimensionally from the original product design. For example, with regard to sipe-molding elements, this deformation not only can result in a dimensionally imperfect sipe-molding member, it can result in a dimensionally imperfect sipe in a tire tread, which in turn can impact tire performance. Techniques are known to assist in the reduction of deformation, but these techniques either require substitution of different material or altering process parameters such as power or speed. Accordingly, there is a need to provide a manner for reducing deformation during product forming operations for any desired material, such for any powder employed during laser sintering (that is, regardless of the powder employed), and without altering process parameters of the operation.

SUMMARY OF THE INVENTION

Particular embodiments of the invention include sipe-molding members comprising a sipe-forming portion and a plurality of stiffening members spaced along the sipe-forming portion. The sipe-forming member has a length extending in a lengthwise direction of the sipe-molding member, a height configured to extend into a depth of a molding cavity, and a thickness extending perpendicular to both the length and height. The sipe-molding member is configured to form a sipe having a thickness commensurate with the thickness of the sipe-forming portion, a length formed by at least a portion of the length of the sipe-forming portion, and a depth formed by at least a portion of the height of the sipe-forming portion. Each of the plurality of stiffening members extend outwardly from the thickness of the sipe-forming element.

Further embodiments of the invention include method for reducing deformation of a sipe-molding member arising during manufacturing operations. Particular embodiments of such methods include a step of forming a sipe-molding member configured to form a sipe in a tire tread. In particular embodiments, the sipe-molding member comprises the sipe-molding member recited above.

Yet further embodiments of the invention methods of forming a molded tire tread. In particular embodiments, such methods include a step of providing a sipe-molding member configured to form a sipe in a tire tread, such as the sipe-molding member described above. A further step includes arranging the sipe-molding member within a mold and molding at least a tire tread, the tire tread including a sipe formed by the sipe-molding member.

The foregoing and other objects, features, and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

FIG. 5 is a perspective view of a sipe-molding member having a plurality of stiffeners extending from and between a sipe-forming portion and a submerged void-forming portion of the sipe-molding member, in accordance with another embodiment of the invention.

FIG. 6 is a side sectional view of the sipe-molding member of FIG. 5, taken along section 6-6.

FIG. 7 is a top sectional view of the sipe-molding member of FIG. 5, taken along section 7-7.

FIG. 8 is a top sectional view of a sipe-molding member in accordance with an alternative embodiment of the sipe-molding member of FIG. 7, where stiffeners on opposing sides of the sipe-forming portion are staggered or offset along a length of the sipe-molding member.

DETAILED DESCRIPTION OF PARTICULAR EMBODIMENTS

Figure 1:
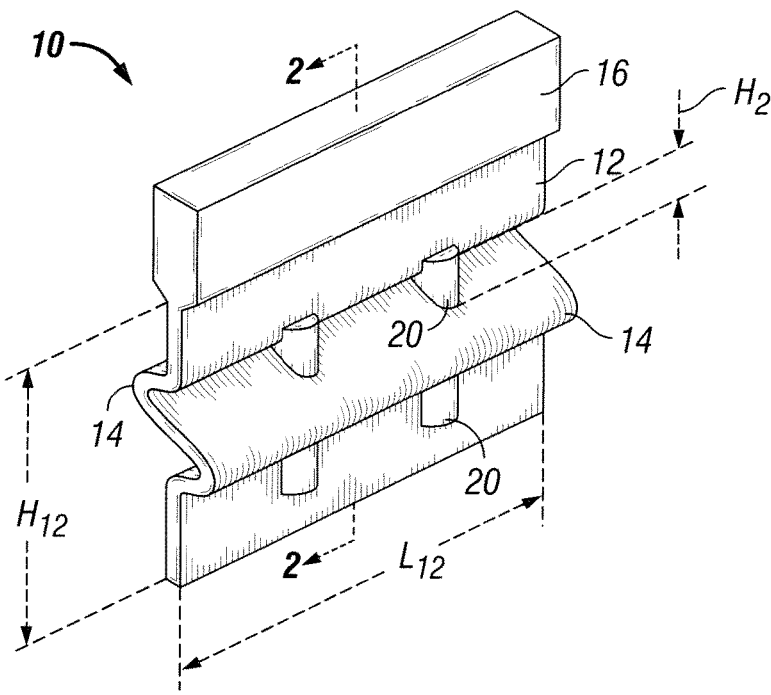
FIG. 1 is a perspective view of a sipe-molding member having a plurality of stiffeners extending outwardly from and along a sipe-forming portion of the sipe-molding member, between undulations of the sipe-forming portion, in accordance with an embodiment of the invention.

Embodiments of the invention comprise a sipe-molding member including a plurality of stiffening members to resist deformation of the sipe-molding member during sipe-molding member formation (manufacturing) operations, to thereby preserve and maintain the dimensional integrity of the sipe-molding member and its design. Accordingly, particular embodiments of the invention include methods for reducing deformation of a sipe-molding member arising during manufacturing of the sipe-molding member, where such methods comprise forming the sipe-molding member with a plurality of stiffeners as discussed herein. Additional embodiments include methods of forming a sipe-molding member and methods of forming a tire tread or tire having one or more sipes each formed by a sipe-molding member.

In particular embodiments, a sipe-forming element includes a sipe-forming portion having a length extending in a lengthwise direction of the sipe-molding member, a height configured to extend into a depth of a molding cavity, and a thickness extending perpendicular to both the length and height. The sipe-molding member is configured to form a sipe having a thickness commensurate with the thickness of the sipe-forming portion, a length formed by at least a portion of the length of the sipe-forming portion, and a depth formed by at least a portion of the height of the sipe-forming portion. As mentioned above, a sipe is a very narrow or thin void or slit, such that, during tire operation, opposing sides of the sipe contact or abutting one another. A void, such as a lateral or longitudinal groove, is sized such that during tire operation, opposing sides of the void remain spaced apart and do not contact one another. By doing so, a void is able to accept water, mud, snow, or any other material for the purpose of facilitating traction between the tread and an intended tire operating surface, such as a road surface.

The thickness of the sipe-forming portion extends in a direction transverse to both the height and length of the sipe-forming portion. The thickness may be constant or variable. It is appreciated that the length and/or the height of the sipe-forming portion may extend along any linear or non-linear path, which may be arcuate or undulating, for example. "Undulating" connotes that the path alternates between multiple changes in direction resulting in a plurality of peaks and valleys, for example. In other words, an undulating path zigs and zags back and forth multiple instances to provide two or more peaks or valleys (that is, apexes and troughs). Exemplary undulating paths include a sinusoidal, saw-tooth, or square-wave path. Therefore, it is contemplated that the non-linear path may be curvilinear or comprise a plurality of linear segments, or any combination thereof.

The sipe-forming element further includes a plurality of stiffening members spaced along the sipe-forming portion, where each of the plurality of stiffening members extend outwardly from the thickness of the sipe-forming element. In being spaced along the sipe-forming portion, the plurality of stiffening members (also referred to herein as "stiffeners") may be spaced apart on any one or both sides of the sipe-forming portion thickness, in any direction, such as in a direction of the sipe-forming portion height and/or length (meaning in any such direction or combination of directions, or in both directions). For example, an array of stiffeners maybe arranged to extend in the direction of the sipe-forming portion height or length, or an array in each such direction. It can be said that in extending outwardly, a stiffener member extends outwardly in a direction of the sipe-forming portion thickness, thereby increasing the local thickness of the sipe-forming portion. By providing stiffening members spaced apart along the length and/or height of the sipe-forming portion, the sipe-forming portion becomes a sipe-forming portion having an increased bending modulus to better resist deformation of the sipe-molding member. Stiffeners also provide a sipe-molding member having an improved mass balance, which provides a more balanced or more uniform arrangement of stresses along the sipe-molding member during heating and cooling cycles to thereby reduce or even eliminate deformation of the sipe-molding member.

In particular embodiments, a stiffener has a height extending in a direction of the sipe-forming portion height. In doing so, the stiffener height can either: (1) extend entirely (that is, completely) in a direction of the sipe-forming portion height defining the sipe-forming portion height, which in other words extends in a direction perpendicular to the sipe-forming portion length or (2) extend partially in the direction of the height, such that when parsing the direction in which the stiffener height extends into two or more vector components, one of the vector components extends in a direction of the sipe-forming portion height defining the sipe-forming portion height. It is appreciated that any stiffener may be arranged to extend along any height of the sipe-forming portion. For example, a height of a stiffener may extend the entire height or any partial height of the sipe-forming portion height. Accordingly, in particular embodiments, each of the plurality of stiffeners extending outwardly from the void-forming portion in a direction of the sipe-forming portion height to a terminal end located at or below the terminal end of the sipe-forming portion. It is appreciated that, in particular embodiments, a mold-attachment portion extends from the terminal end of the sipe-forming portion, which is discussed further herein.

In particular embodiments, a stiffener has a length extending in a direction of the sipe-forming portion length. In doing so, the stiffener length can either: (1) extend entirely (that is, completely) in a direction of the sipe-forming portion length defining the sipe-forming portion length, which in other words extends in a direction perpendicular to the sipe-forming portion height or (2) extend partially in the direction of the length, such that when parsing the direction in which the stiffener length extends into two or more vector components, one of the vector components extends in a direction of the sipe-forming portion length defining the sipe-forming portion length. It is appreciated that any stiffener may be arranged to extend along any length of the sipe-forming portion. For example, a length of a stiffener may extend the entire length or any partial length of the sipe-forming portion length.

It is also appreciated that the stiffener may comprise any desired shape, externally and in cross-section, such as along a plane extending perpendicular to the length of the stiffener. For example, the external shape of a stiffener may be a partial cone, cylinder, or disk, or may comprise a rectangle or square. It is also appreciated that the stiffener may be hollow or solid.

In particular embodiments, the sipe-molding member further includes a void-forming portion having a length extending in a lengthwise direction of the sipe-molding member, or in any other direction of the sipe-molding member or any direction relative the sipe-forming portion. In such embodiments, the height of the sipe-forming portion extends outwardly from the void-forming portion. It is appreciated that the void-forming portion may form any desired void, such as a lateral or longitudinal groove, for example. It is also appreciated that the void-forming portion may be configured to form a void at any location in the tread thickness. For example, in certain embodiments, the void-forming portion is a submerged-forming portion configured to form a void submerged within the tread thickness from a ground-engaging side of the tread. Sipe-molding members having a submerged void-forming portion form what is known within the industry as a tear-drop sipe, where the sipe height extends outwardly toward a ground-engaging side of the tread from a submerged void. Of course, it is understood that the void-forming portion may be arranged to form a void along the ground-engaging side of the tread, such that the void is not submerged and the sipe formed by the sipe-forming portion is instead submerged within the tread thickness below the ground-engaging side of the tread, where the sipe extends into the tread thickness from the void. When submerged, the void or sipe is offset below the ground-engaging side of the tread.

It is appreciated that any sipe or void may have a length extending in any direction transverse to the tread thickness, such as in a direction of the tread length and/or width. For example, the sipe or groove may be a longitudinal or lateral sipe or groove. Longitudinal grooves or sipes generally extend in a direction of the tread length, which may extend circumferentially around the tire. It is also contemplated that a longitudinal groove or sipe may extend at an angle biased to a circumferential direction of the tire. Lateral grooves or sipes generally extend in a direction of the tread width, where the lateral groove or sipe generally extends in a direction perpendicular to a longitudinal centerline of the tread (which extends in a direction of the tread length) or at an angle biased to the longitudinal centerline. It is appreciated that the length of any void or sipe may extend along any linear or non-linear path as desired, where a non-linear path is more fully described herein. Moreover, unless otherwise specified herein, any groove discussed herein may comprise a lateral or longitudinal groove and any sipe may comprise a lateral or longitudinal sipe. Accordingly, unless otherwise specified, a void-forming portion may be a longitudinal or lateral void-forming portion, which is configured to form a longitudinal or lateral groove, respectively. Likewise, unless otherwise specified, a sipe-forming portion may be a longitudinal or lateral sipe-forming portion, which is configured to form a longitudinal or lateral sipe, respectively.

It is appreciated that a stiffener may be spaced-apart from the submerged void-forming portion; however, in certain instances, the plurality of stiffening members are spaced apart along the length of the submerged void-forming portion, where each of the plurality of stiffening members are arranged to extend from and between each of the submerged void-forming portion and the sipe-forming portion.

In particular embodiments, where the sipe-forming portion extends along an undulating, non-linear path in a direction of the sipe-forming portion height, each of the plurality of stiffeners extends between undulations or from one undulation to another undulation of the sipe-forming portion. In doing so, the plurality of stiffeners may be aligned in a direction of the sipe-forming portion height between adjacent undulations, or may be staggered in a direction of the sipe-forming portion length between adjacent undulations. In other embodiments, where the sipe-forming portion extends along an undulating, non-linear path in a direction of the sipe-forming portion length, each of the plurality of stiffeners extends between undulations (that is, a pair of undulating portions) of the sipe-forming portion. In doing so, the plurality of stiffeners may be aligned in a direction of the sipe-forming portion length between adjacent undulations, or may be staggered in a direction of the sipe-forming portion height between adjacent undulations.

In particular embodiments, where a plurality of stiffeners are employed, one or more of the plurality of stiffeners are arranged along each opposing side of the sipe-forming portion, that is, in other words, on opposing sides of the sipe-forming portion thickness. Still, it is appreciated that the plurality of stiffeners may only be arranged on one side of the sipe-forming portion. In instances when stiffeners are arranged on both sides of the sipe-forming portion, the stiffeners may be arranged in any relative side-to-side relationship. In one example, the one or more of the plurality of stiffeners arranged along a first of the opposing sides of the sipe-forming portion thickness are arranged opposite the one or more of the plurality of stiffeners arranged along a second of the opposing sides of the sipe-forming portion thickness. In another example, one or more of the plurality of stiffeners arranged along a first of the opposing sides of the sipe-forming portion thickness are arranged in a staggered relationship along the length of the sipe-forming portion relative to the one or more of the plurality of stiffeners arranged along a second of the opposing sides of the sipe-forming portion thickness.

As noted above, particular embodiments of the invention include methods for reducing deformation of a sipe-molding member arising during manufacturing of the sipe-molding member, where such methods comprise forming the sipe-molding member with a plurality of stiffeners in accordance with any embodiment contemplated herein. It is appreciated that in any embodiment described herein, the sipe-molding member may be formed by any known process. For example, in particular embodiments, the sipe-molding member is a laser sintered product, formed by any known laser sintering process, such as direct or selective laser sintering. By further example, the sipe-molding member may be formed by other 3-dimensional printing processes, molding, or casting. It is also appreciated that the plurality of stiffeners may be added to a pre-existing sipe-molding member, using any know manner for attaching the stiffeners, such as by using adhesive(s), welding, or even fasteners. It is understood that the sipe-molding member may be formed of any known material or composition. Exemplary compositions include any metal or metal composition.

Additional embodiments of the invention include methods of forming a tire tread or tire having one or more sipes each formed by a sipe-molding member. After forming and providing the sipe-molding member, the sipe-molding member is arranged within a mold, the mold having a molding cavity configured to mold at least a tire tread, where the sipe-forming portion of the sipe-molding member is arranged in the molding cavity. To facilitate installation of the sipe-molding member within the mold, in particular embodiments, the sipe-molding member includes a mold-attachment portion, which may comprise any structure or mechanism known to one of ordinary skill in the art. The molding cavity is configured to mold a tire tread, such as when forming a tread for later application to a tire carcass in retreading operations, or a tire that includes a tire tread. In any event, the molding cavity is defined at least in part by an outermost molding surface configured to form a ground-engaging side or surface of the tire tread. The outermost molding surface can also be referred to as the ground-engaging molding surface or portion of the mold or molding cavity. The outermost molding surface is arranged along an outer cavity side, which is generally annular or circumferential in shape. Therefore, when relating any feature of the mold or tire tread to the outermost molding surface, the same relation can be made or drawn relative to the outer cavity side by substituting the outer cavity side for the outermost molding surface. In instances where the sipe-molding member includes a void-forming element, each of the sipe-forming portion and the void-forming portion of the sipe-molding member are arranged in the molding cavity. It is appreciated that the sipe-molding members may be attached or affixed in a mold using any manner known to one of ordinary skill. For example, in particular embodiments, the sipe-molding member includes a mold-attachment portion, which is used to attach to the element to the mold.

Additional embodiments of the method include steps of arranging an uncured tire tread within the mold and curing the tire tread within the mold. During the molding process, the tread is cured, as the tread is generally formed of a curable elastomeric material, such as natural or synthetic rubber or any other polymeric material. These steps contemplate that the mold may be a tire tread mold or a tire mold as discussed further above.

Particular embodiments of the sipe-molding members and methods discussed above will now be described in further detail below in association with the figures filed herewith providing exemplary embodiments of the sipe-molding members and the performance of the methods.

Figure 2:
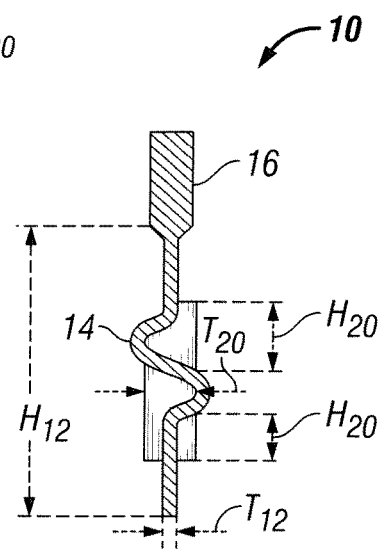
FIG. 2 is a side sectional view of the sipe-molding member of FIG. 1, taken along section 2-2.

With reference to FIGS. 1 and 2, a sipe-molding member 10 is shown in accordance with an exemplary embodiment. The sipe-molding member 10 includes a sipe-forming portion 12 configured to form a sipe, and a mold-attachment portion 16 configured to facilitate attachment of the sipe-molding member to a mold. It is appreciated that a sipe-molding member may or may not include a mold-attachment portion, and if including a mold-attachment portion, it is appreciated that any one or more mold-attachment portions may be employed for attachment to a mold as is known by one of ordinary skill in the art. For example, the mold attachment 16 shown is thicker than the sipe-forming portion. Still, it is appreciated that in other variations the mold attachment member may have a thickness that is the same or thinner than the thickness of the sipe-molding portion. The thickness of the mold attachment member may also be constant or variable, and may extend in a direction of the length or height along any linear or non-linear path.

In FIGS. 1 and 2, the sipe-forming portion 12 has a height $H_{12}$ and a length $L_{12}$, the height extending along an undulating, non-linear path. This is most clearly shown in FIG. 2. The sipe-forming portion 12 also has a thickness $T_{12}$ configured to form a sipe of like thickness. From the thickness $T_{12}$, a plurality of stiffeners 20 extend outwardly from the sipe-forming portion 12, each by a thickness $T_{20}$. To provide an increase in stiffness along a length of the sipe-forming portion, the plurality of stiffeners 20 are spaced apart along length $L_{12}$ of sipe-forming portion 12. Each stiffener 20 also has a height $H_{20}$ extending a partial height $H_{12}$ of the sipe-forming portion. Each stiffener 20 also extends from and between undulations 14 of the sipe-forming portion 12.

Figure 3:
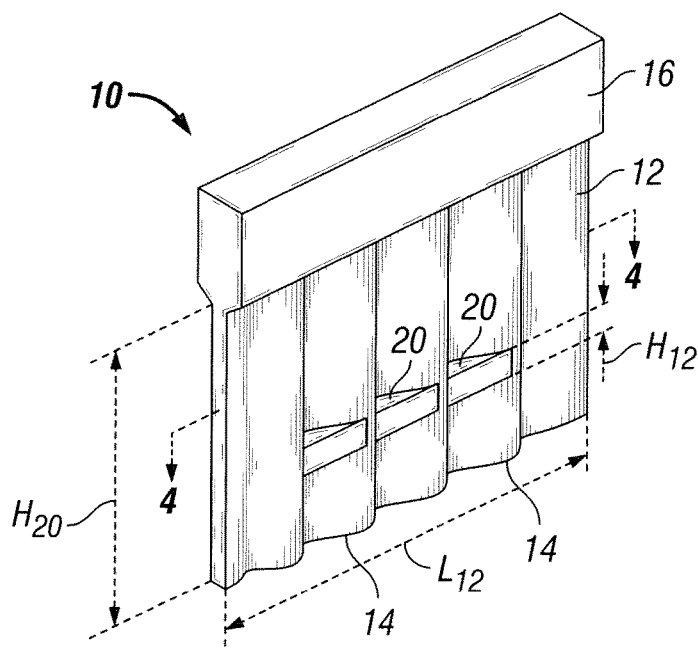
FIG. 3 is a perspective view of a sipe-molding member having a plurality of stiffeners extending outwardly from and along a sipe-forming portion of the sipe-molding member, between undulations of the sipe-forming portion, in accordance with another embodiment of the invention.
Figure 4:
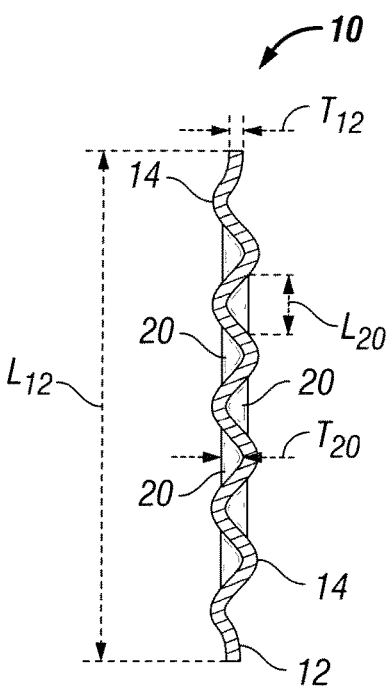
FIG. 4 is a bottom sectional view of the sipe-molding member of FIG. 3, taken along section 4-4.

With reference to another exemplary embodiment in FIGS. 3 and 4, the sipe-forming portion 12 has a length $L_{12}$ extending along an undulating, non-linear path. This is most clearly shown in FIG. 4. A plurality of stiffeners 20 extend outwardly from the sipe-forming portion 12 by a thickness $T_{20}$ and are spaced apart along length $L_{12}$ of sipe-forming portion, extending from and between undulations 14 of the sipe-forming portion. It can also be said that the stiffeners 20 on each side of the sipe-forming portion 12 are arranged in line with (that is, aligned with) one another in a direction of the sipe length, from undulation-to-undulation.

In the exemplary embodiment shown in FIGS. 5 and 6, the sipe-molding member 10 shown includes a void-forming portion 18. In particular, the void-forming portion is a submerged void-forming portion, configured to form a groove offset below a ground-engaging side of a tire tread. In this embodiment, each of the stiffeners 20 extend from and between each of the void-forming portion 18 and the sipe-forming portion 12. It is also noted that the thickness $T_{20}$ of each stiffener extends within a thickness $T_{18}$ of the void-forming portion 18, although it is appreciated that in other variations the thickness of each stiffener may extend beyond the thickness of the void-forming portion.

Figure 9:
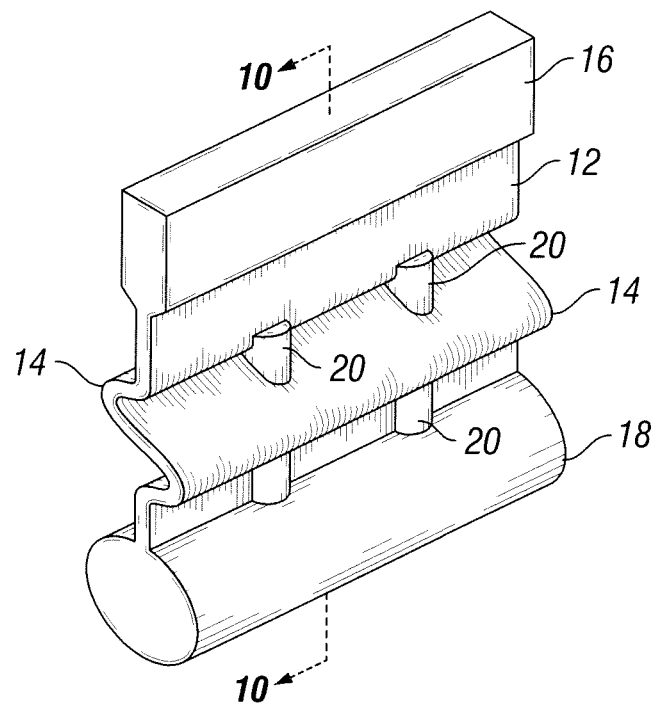
FIG. 9 is perspective view of a sipe-molding member in accordance with an alternative embodiment, where the sipe-forming portion extends along a non-linear path in a direction of the sipe-forming portion height.
Figure 10:
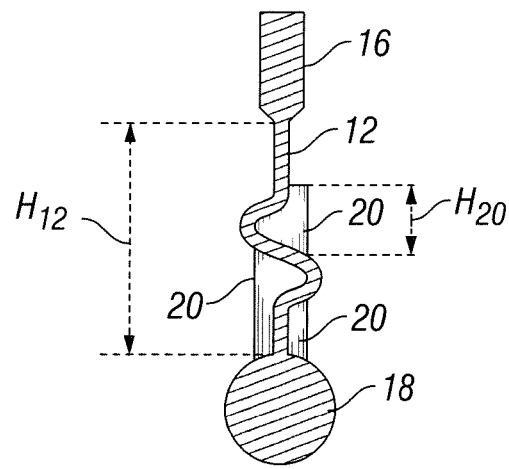
FIG. 10 is a side sectional view of the sipe-molding member of FIG. 9, taken along section 10-10.

As noted above, the stiffeners may be arranged in any relation on opposing sides of the sipe-forming portion. For example, in the embodiment shown in FIG. 7, each stiffener 20 arranged on one side of the sipe-forming portion 12 is aligned with (that is, aligned opposite) a stiffener 20 arranged on the other side of the sipe-forming portion and the sipe-forming portion thickness $T_{12}$. In another embodiment shown in FIG. 8, each stiffener 20 arranged on one side of the sipe-forming portion 12 is aligned with (that is, aligned opposite) a stiffener arranged on the other side of the sipe-forming portion and the sipe-forming portion thickness $T_{12}$. With reference to the exemplary embodiment in FIGS. 9 and 10, stiffeners 20 are arranged to extend not only from and between a pair of undulations 14, where the undulations are adjacent to each other, but certain stiffeners also extend from and between a void-forming portion 18 and an undulation of the sipe-forming portion 12. It can also be said that the stiffeners 20 on each side of the sipe-forming portion 12 are arranged in line with (that is, aligned with) one another in a direction of the sipe-forming portion height, from undulation-to-undulation.

As also noted above, it is understood that stiffeners may comprise any shape. For example, with reference to the embodiment shown in FIGS. 5 and 6, the stiffeners 20 are pyramidal or wedge-shaped, while in the embodiments shown in FIGS. 1, 2, 9 and 10, the stiffeners are cylindrically-shaped.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A sipe-molding member comprising:
   a sipe-forming portion having a length extending in a lengthwise direction of the sipe-molding member, a height configured to extend into a depth of a molding cavity, and a thickness extending perpendicular to both the length and height, the sipe-forming portion extending along an undulating, non-linear path having a plurality of undulations, where each undulation forms a valley arranged opposite a peak relative the thickness of the sipe-forming portion, the sipe-molding member configured to form a sipe having a thickness commensurate with the thickness of the sipe-forming portion, a length formed by at least a portion of the length of the sipe-forming portion, and a depth formed by at least a portion of the height of the sipe-forming portion; and, a plurality of stiffening members spaced along the sipe-forming portion, where each of the plurality of stiffening members extends outwardly from the thickness of the sipe-forming portion and extends from and between adjacent undulations of the plurality of undulations of the sipe-forming portion such that each stiffener extends across the valley associated with one of the undulations, where each of the plurality of stiffening members extend only a partial distance along the sipe-forming portion height.

2. The sipe-molding member of claim 1, further comprising:

a void-forming portion having a length extending in a lengthwise direction of the sipe-molding member, a height extending in a direction of the sipe-forming portion, and a thickness extending in a direction perpendicular to both the length and height of the void-forming portion, where the height of the sipe-forming portion extends outwardly from the void-forming portion, and, where the plurality of stiffening members are spaced apart along the length of the void-forming portion and the thickness of each of the plurality of stiffening members extends within a thickness of the void-forming portion, each of the plurality of stiffening members arranged to extend from and between each of the void-forming portion and the sipe-forming portion.

3. The sipe-molding member of claim 2, where the void-forming portion is a submerged void-forming portion configured to be arranged within the molding cavity and form a submerged void within a thickness of a tread contained in the molding cavity, whereby the submerged void is to be arranged below a ground-engaging side of the tread.

4. The sipe-molding member of claim 2, where the sipe-forming portion extends outwardly from the void-forming portion to a terminal end of the sipe-forming portion defining the height of the sipe-forming portion, each of the plurality of stiffening members extending outwardly from the void-forming portion in a direction of the sipe-forming portion height to a terminal end located at or below the terminal end of the sipe-forming portion.

5. The sipe-molding member of claim 2, where the sipe-molding member is arranged within a mold, the mold having a molding cavity configured to mold at least a tire tread, where each of the sipe-forming portion and the void-forming portion of the sipe-molding member are arranged in the molding cavity.

6. The sipe-molding member of claim 5, where the mold is a tire mold.

7. The sipe-molding member of claim 1, where the undulating, non-linear path extends in a direction of the height of the sipe-forming portion.

8. The sipe-molding member of claim 1, where the undulating, non-linear path extends in a direction of the length of the sipe-forming portion.

9. The sipe-molding member of claim 1, where one or more of the plurality of stiffening members are arranged along one or more opposing sides of the sipe-forming portion thickness.

10. The sipe-molding member of claim 9, where the one or more of the plurality of stiffening members arranged along a first of the opposing sides of the sipe-forming portion thickness are arranged opposite the one or more of the plurality of stiffening members arranged along a second of the opposing sides of the sipe-forming portion thickness.

11. The sipe-molding member of claim 9, where the one or more of the plurality of stiffening members arranged along a first of the opposing sides of the sipe-forming portion thickness are arranged in a staggered relationship along the length of the sipe-forming portion relative to the one or more of the plurality of stiffening members arranged along a second of the opposing sides of the sipe-forming portion thickness.

12. The sipe-molding member of claim 1, where each of the plurality of stiffening members are hollow.

13. The sipe-molding member of claim 1, where the sipe-molding member is a laser sintered product.

14. The sipe-molding member of claim 1, where the sipe-molding member is arranged within a mold, the mold having a molding cavity configured to mold at least a tire tread, where the sipe-forming portion of the sipe-molding member is arranged in the molding cavity.

15. The sipe-molding member of claim 14, where the mold is a tire mold.

16. The sipe-molding member of claim 1, where in extending outwardly from the thickness of the sipe-forming portion, each of the plurality of stiffeners extends in a direction perpendicular to both the sipe-forming portion length and height within a distance defined by a peak of each adjacent undulation of the plurality of undulations.

17. A method of reducing deformation of a sipe-molding member arising during manufacturing operations, the method comprising:

forming a sipe-molding member configured to form a sipe in a tire tread, the sipe-molding member comprising:

a sipe-forming portion having a length extending in a lengthwise direction of the sipe-molding member, a height configured to extend into a depth of a molding cavity, and a thickness extending perpendicular to both the length and height, the sipe-forming portion extending along an undulating, non-linear path having a plurality of undulations, where each undulation forms a valley arranged opposite a peak relative the thickness of the sipe-forming portion, the sipe-molding member configured to form a sipe having a thickness commensurate with the thickness of the sipe-forming portion, a length formed by at least a portion of the length of the sipe-forming portion, and a depth formed by at least a portion of the height of the sipe-forming portion; and, a plurality of stiffening members spaced along the sipe-forming portion, where each of the plurality of stiffening members extends outwardly from the thickness of the sipe-forming portion and extends from and between adjacent undulations of the plurality of undulations of the sipe-forming portion such that each stiffener extends across the valley associated with one of the undulations, where each of the plurality of stiffening members extend only a partial distance along the sipe-forming portion height.

18. The method of claim 17, where the sipe-molding member is formed by laser sintering.

19. A method of forming a molded tire tread, the method comprising the steps of:

providing a sipe-molding member configured to form a sipe in a tire tread, the sipe-molding member comprising:

a sipe-forming portion having a length extending in a lengthwise direction of the sipe-molding member, a height configured to extend into a depth of a molding cavity, and a thickness extending perpendicular to both the length and height, the sipe-forming portion extending along an undulating, non-linear path having a plurality of undulations, where each undulation forms a valley arranged opposite a peak relative the thickness of the sipe-forming portion, the sipe-molding member configured to form a sipe having a thickness commensurate with the thickness of the sipe-forming portion, a length formed by at least a portion of the length of the sipe-forming portion, and a depth formed by at least a portion of the height of the sipe-forming portion; and, a plurality of stiffening members spaced along the sipe-forming portion, where each of the plurality of stiffening members extends outwardly from the thickness of the sipe-forming portion and extends from and between adjacent undulations of the plurality of undulations of the sipe-forming portion such that each stiffener extends across the valley associated with one of the undulations, where each of the plurality of stiffening members extend only a partial distance along the sipe-forming portion height;

arranging the sipe-molding member within a mold and molding at least a tire tread, the tire tread including a sipe formed by the sipe-molding member.

20. The method of claim 19, where the mold is a tire mold.

\* \* \* \* \*